May 5, 1970    M. D. WALKLET ET AL    3,510,007
TIRE DISPLAY APPARATUS
Filed March 27, 1968    2 Sheets-Sheet 1
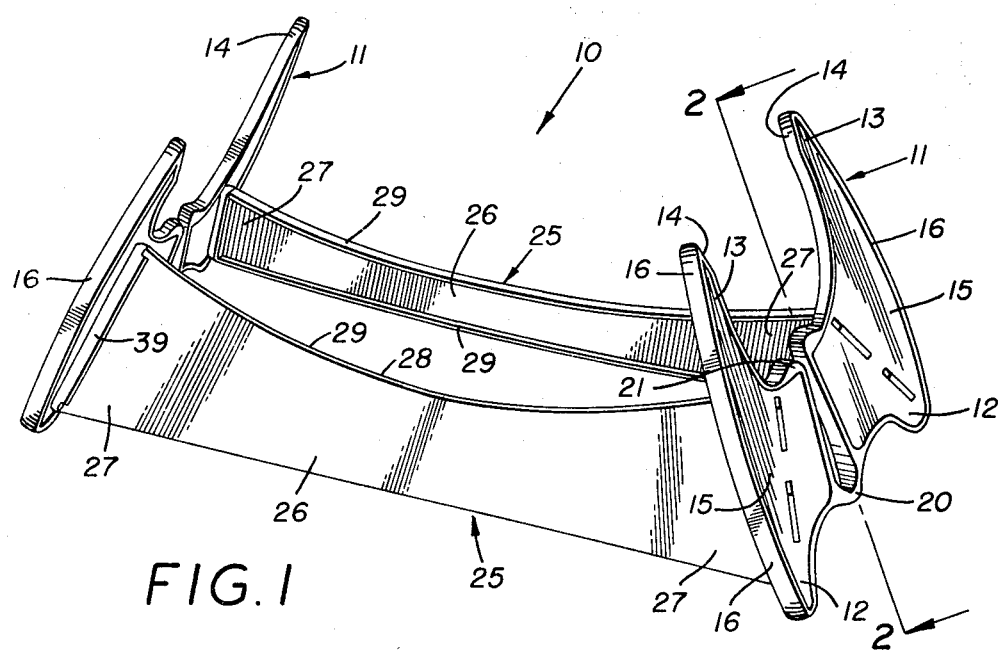
FIG. I
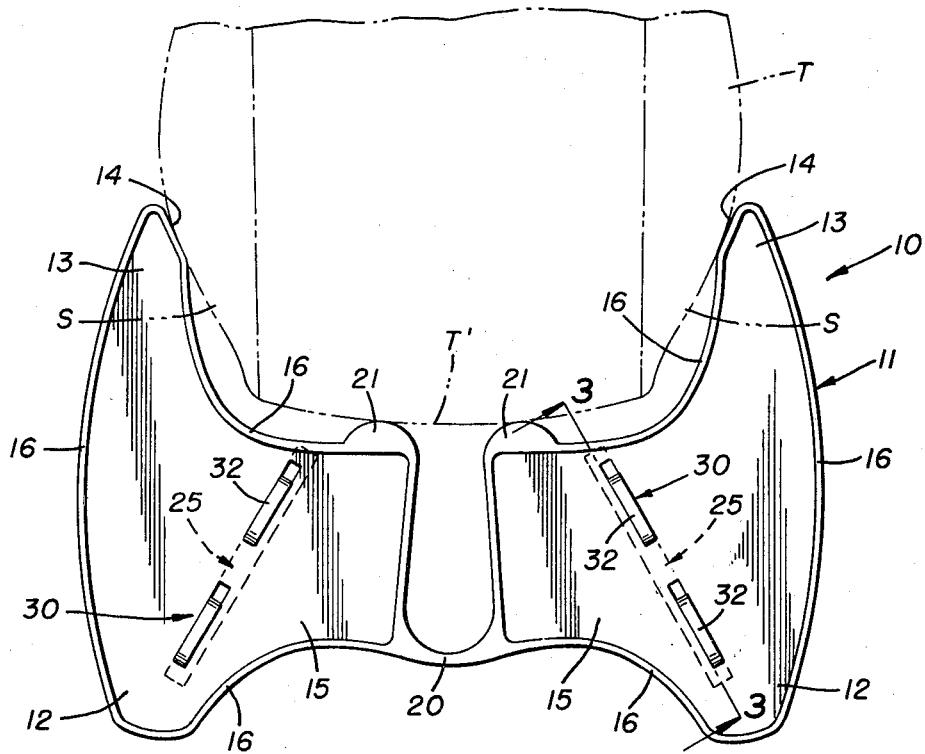
FIG. 2
INVENTORS
MERCER D. WALKLET
THOMAS P. RADEMACHER
BY Hamilton, Cook,
Renner  Kenner
ATTORNEYS May 5, 1970  M. D. WALKLET ET AL  3,510,007
TIRE DISPLAY APPARATUS Filed March 27, 1968  2 Sheets-Sheet 2

INVENTORS
MERCER D. WALKLET
THOMAS P. RADEMACHER
BY Hamilton, Cook,
Renner & Kenner
ATTORNEYS

United States Patent Office 3,510,007
Patented May 5, 1970

---

3,510,007
TIRE DISPLAY APPARATUS
Mercer D. Walklet, Akron, and Thomas P. Rademacher, Medina, Ohio, assignors, by mesne assignments, to Adolph Kiefer-McNeil, a division of McNeil Corporation, Akron, Ohio, a corporation of Ohio
Filed Mar. 27, 1968, Ser. No. 716,555
Int. Cl. A47f 7/04
U.S. Cl. 211—24        2 Claims

---

ABSTRACT OF THE DISCLOSURE

A tire display stand which is adapted to support pneumatic tires in a generally upright position having end frame members with spaced legs, with a surface for seating a tire tread on either side of a hinge area and with extending arms for engaging the sidewall portion of a tire to provide lateral support and having side panels spacing and joining said end frames and serving as advertising escutcheons.

---

BACKGROUND OF THE INVENTION

The present invention relates generally to tire display apparatus for showing vehicle tires in retail outlets, showrooms, and the like. More particularly, the invention relates to a tire display stand which will support pneumatic tires in a generally upright position.

Although pneumatic tires can be stored and displayed perhaps most easily and with greatest conservation of space by stacking in a horizontal position, experience has taught that such handling is sufficiently aesthetically deficient as to adversely influence the sale of tires. As a result, it has become common practice to support pneumatic tires in a generally upright or vertical position which simulates the orientation assumed when mounted on a vehicle. Although numerous devices have been devised to so support pneumatic tires, none have proven to be totally successful.

Heretofore, tire display stands have been commonly constructed as rigid structures of wire strand material designed to support only a particular or limited portion of the many sizes and shapes of tires now being marketed. These stands normally will not accommodate relatively large tires at all; and, the insertion of smaller tires than that for which the apparatus is designed results in a leaning or tilting of the tire which may adversely affect the stability of both the stand and tire. In addition, most wire strand material which can be economically employed is subject to rust and weather deterioration when used outdoors over extended periods of time. Additionally, these existing stands are normally difficult to assemble and somewhat dangerous in that sharp points or edges may wound a person attempting to effect assembly. Additionally many of these stands cover a portion of the displayed tire, thereby partially obstructing the view of a potential customer which diminishes the effectiveness of the apparatus.

SUMMARY OF THE INVENTION

It is therefore an object of the present invention to provide a universal tire display stand which will accommodate a wide variety of sizes of pneumatic tires. Another object of the invention is to provide a display stand which will support different sizes of tires in a generally upright position with great stability. A further object of the invention is to provide a display stand which is composed of a plurality of components that interlockingly engage each other and that can be erected or dismantled by hand without the necessity of tools.

It is still another object of the invention to provide a display stand which may be constructed of a plastic material that does not deteriorate when subjected to outdoor weather conditions and is otherwise unaffected by climatic conditions. Yet another object of the invention is to provide a tire display stand which can be dismantled into a plurality of components that are convenient to store or ship. A still further object is to provide a tire display stand having panels suitably situated to serve as advertising escutcheons. A final object is to provide a tire display stand which is relatively non-complex, inexpensive, and maintenance free.

In general, a tire display stand according to the concept of the present invention contemplates a pair of spaced frame members adapted to seat a pneumatic tire, extending legs on the frame members spaced and joined by a hinge portion, arms on the frame members to engage the sidewall portion of a tire, and panels connecting the frame members.

DESCRIPTION OF THE DRAWINGS

FIG. 1 is a perspective view of a tire display stand constituting a preferred form of the present invention in its fully assembled form.

FIG. 2 is an end elevation of the tire display stand viewed substantially along line 2—2 of FIG. 1 and showing a portion of a tire in chain lines supported therein by an end frame member.

DESCRIPTION OF A PREFERRED EMBODIMENT

Figure 3:
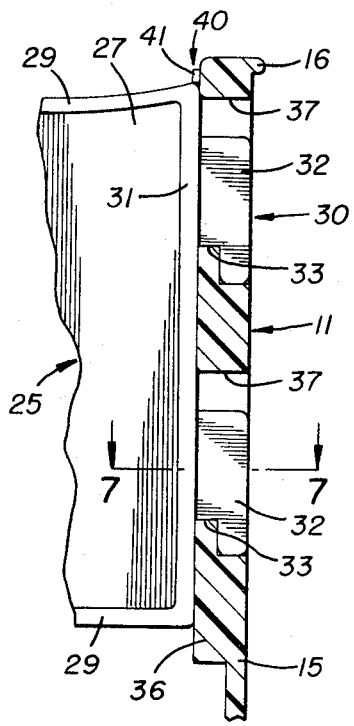
FIG. 3 is a fragmentary section view taken substantially on line 3—3 of FIG. 2 and showing the interrelation between the end frame member and the side panel when connected in the assembled form.

Referring now to the drawings generally and particularly to FIGS. 1 and 2, a tire display stand, generally indicated by the numeral 10, is shown in its fully assembled condition suitable for supporting a pneumatic tire T, partially shown in chain lines in FIG. 2. The tire T is supported in a generally upright position with respect to any surface on which the stand 10 is placed, so that placement on a floor or other horizontal surface places the tire T in a substantially vertical position simulating the orientation when mounted on a vehicle.

The tire display stand 10, as shown, has a pair of end frame members, generally indicated by the numeral 11, which engage and support the tire T. Since the end frame members 11 are preferably identical for ease of manufacture and assembly, only one frame member 11 will be described in detail, it being understood that the description is equally applicable to either of the end frame members 11. Each end frame member 11 may be generally H-shaped with a pair of spaced, extending legs or feet 12. Extending generally in the opposite direction from the legs 12 is a pair of engaging arms 13 which contact opposed sidewall portions S of a tire T positioned in the stand 10, one associated with each of the legs 12. If desired, the engaging arms 13 may be provided with conour surfaces 14 shaped for extended conformance with the sidewall portion of a tire T. Interposed between each of the legs 12 and its associated arms 13 are body portions 15 which extend laterally under part of tread portion T' of tire T.

For ease of construction, respective legs 12, arms 13, and body portions 14 may be integrally formed as a single unit. If desired, these components may be made of a relatively thin material reinforced by a peripheral rim flange 6, as disclosed in the preferred embodiment described herein.

Adjacent body portions 15 of each end frame member 11 are pivotally joined by a hinge section 20 which provides adjustment to accommodate different sizes of tires T. Thus, the distance between the engaging arms 13 is varied dependent upon the width of a tire T between opposed sidewalls S. A construction capable of adjustment to accommodate all sizes of passenger car and light truck tires can be readily achieved. Although the hinge section 20 may take various forms, the preferred embodiment contemplates the use of plastic materials such as polyethylene, polypropylene, or other similar materials having the property of forming a so-called "living hinge" in a portion of reduced cross-sectional dimension. The term "living hinge" derives from the fact that the material can be repeatedly flexed without failure and may, in some instances, develop improved strength characteristics with use. Also, most of these materials are rigid, weather resistant, susceptible of simple molding, and easy to decorate with long lasting paints, so as to constitute an advantageous material for the entire display stand 10.

When a tire T is seated on the upper surface of body portions 15 adjacent hinge member 20, the body portions 15 pivot about the hinge 20 bringing the arm 13 into contact with opposed portions of sidewalls S of tire T to hold it firmly in position. Although the center of the tread portion T' of tire T is normally sufficiently centrally crowned or extending so that it contacts body portions 15 near hinge member 20 to produce the desired pivoting, this action may be further insured by incorporating a projecting knob 21 on each of the body portions 15 near their inner extremities. In any instance, the desired pivoting can be obtained so long as the tire T contacts body portions 15 between or inwardly of legs 12.

The end frame members 11 are spaced and joined by two side panels, generally indicated by the numeral 25, in the preferred embodiment which position the end frame members 11 in proper relation to receive a tire T. Since only one side panel 25 may be employed and since the two side panels 25 disclosed may be identical for ease of manufacture and handling, the following description will be directed to a single side panel 25. As shown, a side panel 25 is a generally elongate strut 26 and may have the extremities 27 beveled so that the attached end frame members 11 lie in a plane which is generally directed radially of a supported tire T. Depending upon size and positioning, a side panel 25 may have a centrally dished or cutout section 28 in order to preclude possible interference with the periphery of a tire T. In a manner similar to the end frame members, the side panels 25 may be made of a relatively thin material reinforced by a peripheral rim flange 29 which imparts additional strength and rigidity. The elongate strut 26 when constituted as an extended flat surface may serve as an advertising escutcheon by carrying a paper or cardboard overlay (not shown) giving the name of the manufacturer, details on particular displayed product, or other information.

Figure 4:
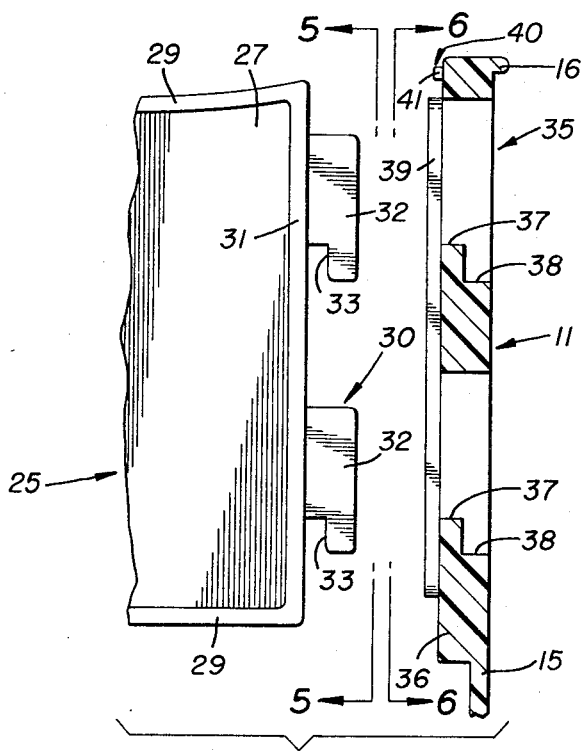
FIG. 4 is a view similar to FIG. 3 with the end frame member and the side panel disconnected in the dismantled condition.
Figure 5:
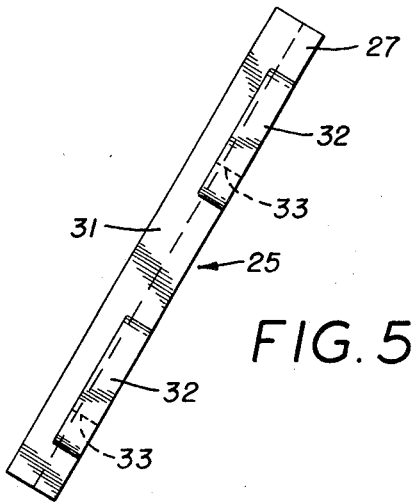
FIG. 5 is an elevation view of a side panel as viewed along line 5—5 of FIG. 4 and showing the attachment device.

The side panels 25 are connected to the end frame members 11 in such a manner as to provide preferably a strong, somewhat rigid attachment which may lock to prevent accidental dismantling. As shown in FIGS. 3–5, the preferred embodiment has an attachment device, generally indicated by the numeral 30, located in the extremity 27 of side panel 25. The attachment device has rim flange 31 which may be a continuation of the peripheral rim flange 29 and preferably two spaced hook members 32 extending therefrom and formed by providing an undercut portion 33 at one extremity thereof.

Figure 6:
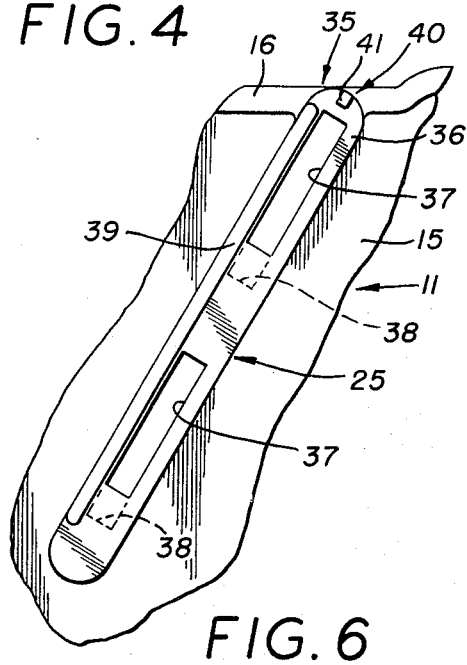
FIG. 6 is a fragmentary elevation view of an end frame member as viewed along line 6—6 of FIG. 4 and showing the receiver for the attachment device of a side panel.

Each end frame member 11 is provided with receivers 35 which accommodate the attachment devices 30 of the side panels 25. As shown, the receivers are mounted generally in the body portions 15 of the end frame members 11; however, the exact location is not critical so long as the side panels 25 do not interfere with a supported tire T. As shown in FIGS. 3, 4, and 6, each receiver 35 has an upstanding rib 36 with respect to the body portion 15. Spaced along the rib 36 are slots 37 which may extend through both the rib 36 and backup body portion 15 to receive hook members 32 of attachment device 30. In order to maintain a tight, somewhat rigid fit, the slots 37 are preferably only slightly larger in longitudinal and transverse dimensions than the hooks 32. One longitudinal extremity of each slot 37 has an additional cutaway portion or notch 38 extending through body portion and into rib 36 (FIG. 4).

Figure 7:
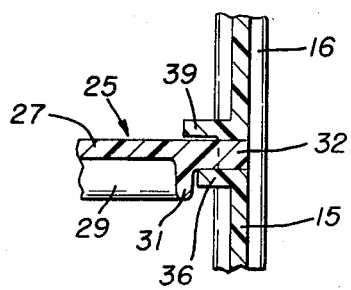
FIG. 7 is a fragmentary section view taken substantially along line 7—7 of FIG. 3 showing the details of the connection between an end frame member and a side panel when assembled.

In assembling display stand 10, the hooks 32 of attachment device 30 are inserted in the slots 37 of receiver 35. The side panel 25 is then forced downwardly relative to the end frame member 11 so that the entremity of hook 32 formed by undercut portion 33 engages a mating notch 38. This assembled interlocking fit is best seen in FIG. 3. Additional rigidity results from the fact that rim flange 31 of attachment device 30 seats against the outward surface of rib 36 of receiver 35. The rib 36 may be provided with an outwardly extending strip 39 (FIGS. 4, 6, and 7) which engages the extremity 27 of side panel 25 in order to give side panel 25 lateral rigidity and maintain end frame member 11 and side panel 25 in substantially perpendicular relation.

In order to maintain the end frame members 11 and side panels 25 in the assembled position shown in FIG. 4 and described above, a locking device, generally indicated by the numeral 40, may be provided so that dismantling cannot occur accidentally when display stand 10 is erected, moved, or otherwise manipulated. As shown, the locking device 40 in a preferred form when end frame members 11 are constructed of polyethylene or a material having similar characteristics is an extending nub 41 which seats against the top of rim flange 31 when the stand 25 is interlockingly erected as seen in FIG. 4, thereby precluding upward movement of the side panel 25 relative to end frame member 11 (FIG. 4). When the locking device 40 is to be released to dismantle the stand 25, the end frame 11 which is relatively thin is slightly flexed with the upper part moved to the right in the FIG. 4 while the side panel 25 is simultaneously moved upwardly relative to end frame member 11 so that the rim flange 31 of side panel 25 slides past the extending nub 41.

It can be seen that the disclosed apparatus carries out the objects set forth above. Since various modifications in details, materials, and arrangement of parts are within the spirit of the invention herein disclosed and described, the scope of the invention should be limited solely by the scope of the attached claims.

We claim:

1. Apparatus for supporting a tire in a substantially upright position comprising, two end frame members, means engaging the tread portion (T') of a tire on said frame members, arm means on said frame members, hinge means on said frame members pivoting said arm means into contact with the sidewall portions (S) of a tire on said frame members, and two side panels spacing and joining said frame members, said side panels having attachment means and said frame members having receiver means to engage said attachment means, said side panel attachment means including a peripheral flange with spaced extending hook members and said frame member receiver means including an upstanding rib, slots in said rib sized to accommodate said hook members, and a notch cooperating with said hook members in selective securing relation.

2. Apparatus according to claim 1, wherein said upstanding rib on a frame member has an extending strip engaging a side panel to provide additional rigidity between said frame members and said side panels.

References Cited

UNITED STATES PATENTS

| | | | |
|---|---|---|---|
| 1,252,073 | 1/1918 | Achert | 211—24 |
| 1,539,519 | 5/1925 | Shank | 211—24 |
| 1,640,792 | 8/1927 | Metzger | 211—24 |
| 1,714,023 | 5/1929 | Harley | 211—24 |
| 1,717,560 | 6/1929 | Henle | 211—24 |
| 1,901,475 | 3/1933 | Shank | 211—24 |
| 2,100,077 | 11/1937 | Harrison | 211—24 X |
| 3,294,244 | 12/1966 | Laughlin | 211—41 |

DAVID H. BROWN, Primary Examiner